United States Patent [19]

Foster et al.

[11] Patent Number: 4,938,696

[45] Date of Patent: Jul. 3, 1990

[54] MODEL DEMONSTRATING HUMAN ORGAN SYSTEMS

[75] Inventors: Betty J. Foster, Crystal; Barbara L. Pickard, Maple Grove, both of Minn.

[73] Assignee: Foster-Pickard International, Inc., Maple Grove, Minn.

[21] Appl. No.: 394,411

[22] Filed: Jul. 25, 1989

[51] Int. Cl.⁵ ............................................. G09B 23/30
[52] U.S. Cl. ....................................... 434/267; 434/272
[58] Field of Search ............... 434/262, 267, 269, 272, 434/274; 446/369

[56] References Cited

U.S. PATENT DOCUMENTS

| 175,519 | 3/1876 | Steiger | 434/274 |
| 2,678,505 | 7/1951 | Munson | 434/272 |
| 2,971,272 | 2/1961 | Barlow | 434/272 |
| 3,009,267 | 11/1961 | Bezark | 434/272 |
| 4,288,222 | 2/1980 | Kling | 434/369 X |

FOREIGN PATENT DOCUMENTS 699055 11/1940 Fed. Rep. of Germany ...... 434/272

OTHER PUBLICATIONS

"Orientation Exploration"; *The Science Teacher;* Jan. 1969; pp. 547–550.

*Primary Examiner*—Richard J. Apley
*Assistant Examiner*—Rachel M. Healey
*Attorney, Agent, or Firm*—Haugen and Nikolai

[57] ABSTRACT

A model for the demonstration of the human organ system, including organs of the digestive system. The model includes a foldable support surface having the shape of a human silhouette. An abdominal tray is attached to the mid-section of the support surface and a first group of elements representative of human organs is housed within the abdominal tray. In an adult embodiment of the model, the first group of elements includes elements representing a human liver, pancreas, gall bladder and associated ducts. A second group of elements is partially housed within the abdominal tray and is removable. The second group, as provided in the adult embodiment of the model, includes elements representing a human esophagus, stomach, greater omentum, small intestine, mesentery, appendix, large intestine and rectum. Both the first and second groups of elements are substantially comprised of a flexible material such as a color-coded calico, cotton cloth. Ducts may be comprised of color-coded chenille stems. The greater omentum and mesentery may be preferably comprised of color-coded nylon netting. A color-coded outline of the stomach, small intestine, large intestine, esophagus and rectum is attached to the abdominal tray so as to provide points of reference for reattachment of the second group of elements.

12 Claims, 6 Drawing Sheets

MODEL DEMONSTRATING HUMAN ORGAN SYSTEMS

FIELD OF THE INVENTION

The invention is directed generally to models demonstrating human organ systems and, more particularly, to a model having color coded, flexible and removable elements representing organs of the human digestive system.

DISCUSSION OF THE PRIOR ART

Currently available anatomical models used for teaching biological sciences are comprised of hard molded materials or a combination of hard and semi-rigid plastic. These models average about 20 to 25 lbs in weight. The weight and rigidity of existing models make them difficult to transport and use. Further, only a limited number of configurations exist for displaying the models currently available. Known models typically are commercially available in two forms, torso models and relief models. Torso models typically include a head and no extremities. Torso models typically require a table or similar support for display. Relief models typically are restricted to either placement on a support while being propped against a wall, or rigid mounting on a wall.

Prior art models also lack reference points for the replacement of parts which have been removed. There are no models currently available which easily demonstrate the actual length of the digestive tract or which allow removal of the digestive tract in one piece while retaining the continuity of the system. Further commercially available models lack dynamic eye appeal, and tend to be intimidating to persons not familiar with the medical field.

In contrast to the prior art, the present invention provides a demonstration model which is more versatile in several ways. The model of the present invention may be hung on a wall and easily removed. It may be displayed on a table using a carrying case for support, or used in a free-standing manner. It may also be held in a person's lap. The invention further provides a means for spreading out the gastrointestinal ("GI") tract (excluding the pharynx) on a table to form a variety of displays while the entire tract remains connected. Further, the invention provides a model wherein the GI tract can be removed in one piece for a separate display and can be extended to demonstrate its entire length. In addition to the above described features, the present invention provides a model which is relatively light weight, completely portable, and which provides a wide variety of display positions.

The organs and membranes of the present invention are made of flexible materials such as nylon and cotton blend fabrics in contrast to the hard and semi rigid plastics currently used in other models. The present invention provides a model which is colorful and non-threatening to the viewer.

The present invention further provides a model wherein elements representing ducts remain intact when elements representing organs are removed, thus, offering improved views of the ducts. As provided in the present invention, ducts remain attached to their target organs thereby retaining the anatomical relationship between the organ and the destination of the duct.

BRIEF SUMMARY OF THE INVENTION

A model for the demonstration of the human organ system, including organs of the digestive system is disclosed. In the preferred embodiment, the model includes a foldable support surface having the shape of a human silhouette. An abdominal tray is attached to the mid-section of the support surface and a first group of elements representative of human organs is housed within the abdominal tray. In an adult embodiment of the model, the first group of elements includes elements representing a human liver, pancreas, gall bladder and associated ducts. A second group of elements is partially housed within the abdominal tray and is removable. The second group, as provided in the adult embodiment of the model, includes elements representing a human esophagus, stomach, greater omentum, small intestine, mesentery, appendix, large intestine and rectum. Both the first and second groups of elements are substantially comprised of a flexible material such as a color-coded calico, cotton cloth. Ducts may be comprised of color-coded chenille stems. The greater omentum and mesentery may be preferably comprised of color-coded nylon netting. In the preferred embodiment of the invention, a color-coded outline of the stomach, small intestine, large intestine, esophagus and rectum is attached to the abdominal tray so as to provide points of reference for reattachment of the second group of elements.

It is one object of the invention to provide a life-sized model for teaching or counselling persons about the human organ system which has bright colors, is flexible, is aesthetically pleasing and non-threatening in appearance.

It is another object of the invention to provide a model wherein the entire GI tract, with the exception of the pharynx, can be removed as a unit and can easily be returned to its natural position in the model.

It is another object of the invention to provide a model which includes full scale representations of the large and small intestines so as to allow for displaying the full length of those organs.

It is yet a further object of the invention to provide a model wherein the individual parts of the digestive tract are easily recognizable and are designated by color.

It is yet a further object of the invention to provide a model having permanent calico fabric outlines which provide points of reference for the natural position of the organs thereby facilitating replacement of the GI tract after it has been removed.

It is still a further object of the invention to provide a model which portrays membranes in a unique fashion, that is, each membrane is illustrated as a distinct, flexible element.

It is still a further object of the invention to provide color-coded elements representing ducts which remain attached to their target organs.

Other objects, features and advantages of the invention will be appreciated by those skilled in the art from the description of the preferred embodiment, claims and drawings herein wherein like numerals refer to like elements.

DESCRIPTION OF THE PREFERRED EMBODIMENT

Figure 1:
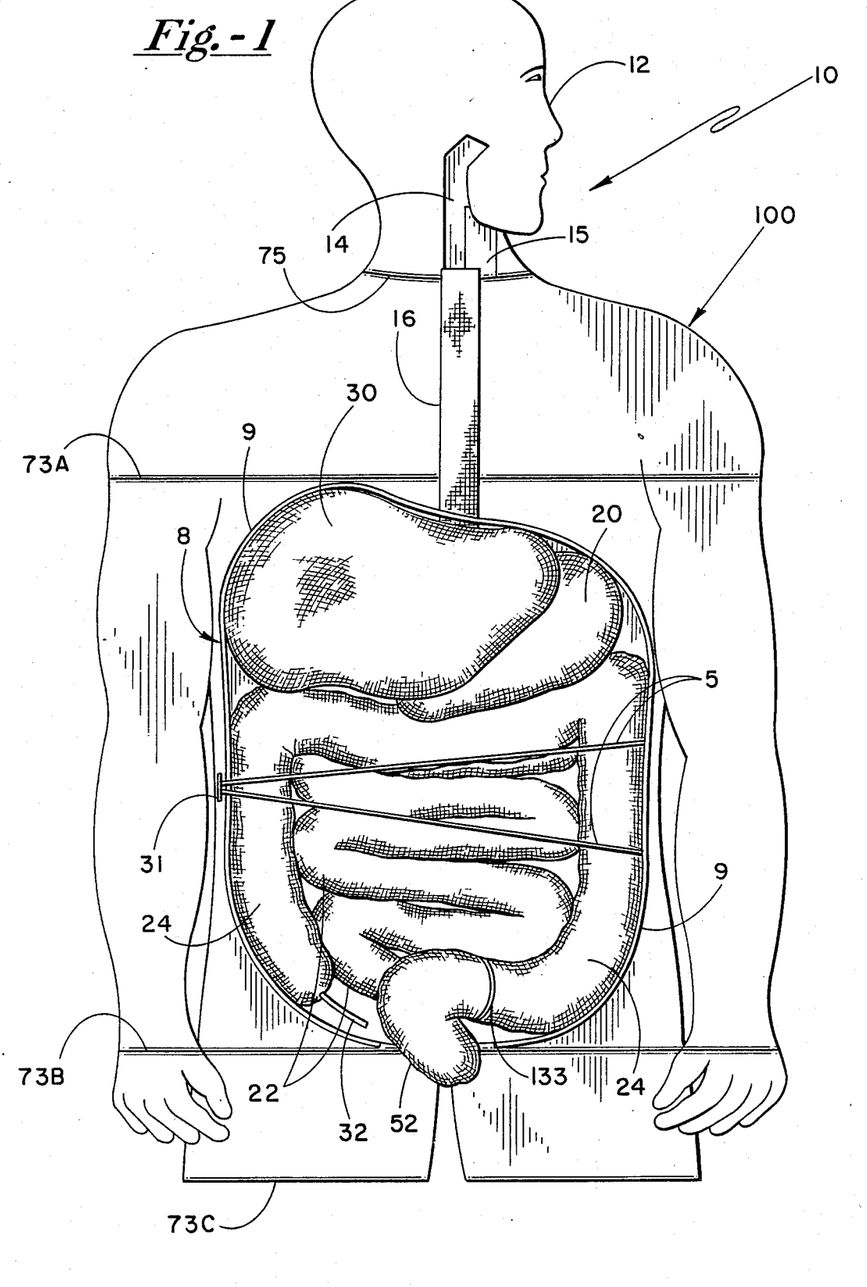
FIG. 1 shows schematically a front view of the demonstration model of the invention wherein all of the organ elements are housed in an abdominal tray.

Referring now to FIG. 1, a view of one embodiment of the model of the invention 10 is shown wherein elements representing various human organs are encased in abdominal tray 8. The model comprises a support surface 100 including a head 12. The abdominal tray 8 is attached to the support surface 100 and comprises a stiff-walled enclosure of sufficient height to house the elements representing various organs. Enclosed within the abdominal tray are fabric organ elements including elements representing a human liver 30, stomach 20, small intestine 22, large intestine 24, rectum 52 and a strip or stem representing an appendix 32. A cord 5 or equivalent strap or device may be attached to the abdominal tray and stretched across the elements in the abdominal tray to facilitate holding the elements in place during demonstrations using the model. Also included in the model and mounted to the support surface 100 are elements representing an esophagus 16 and a pharynx 14.

Figures 2, 2A:
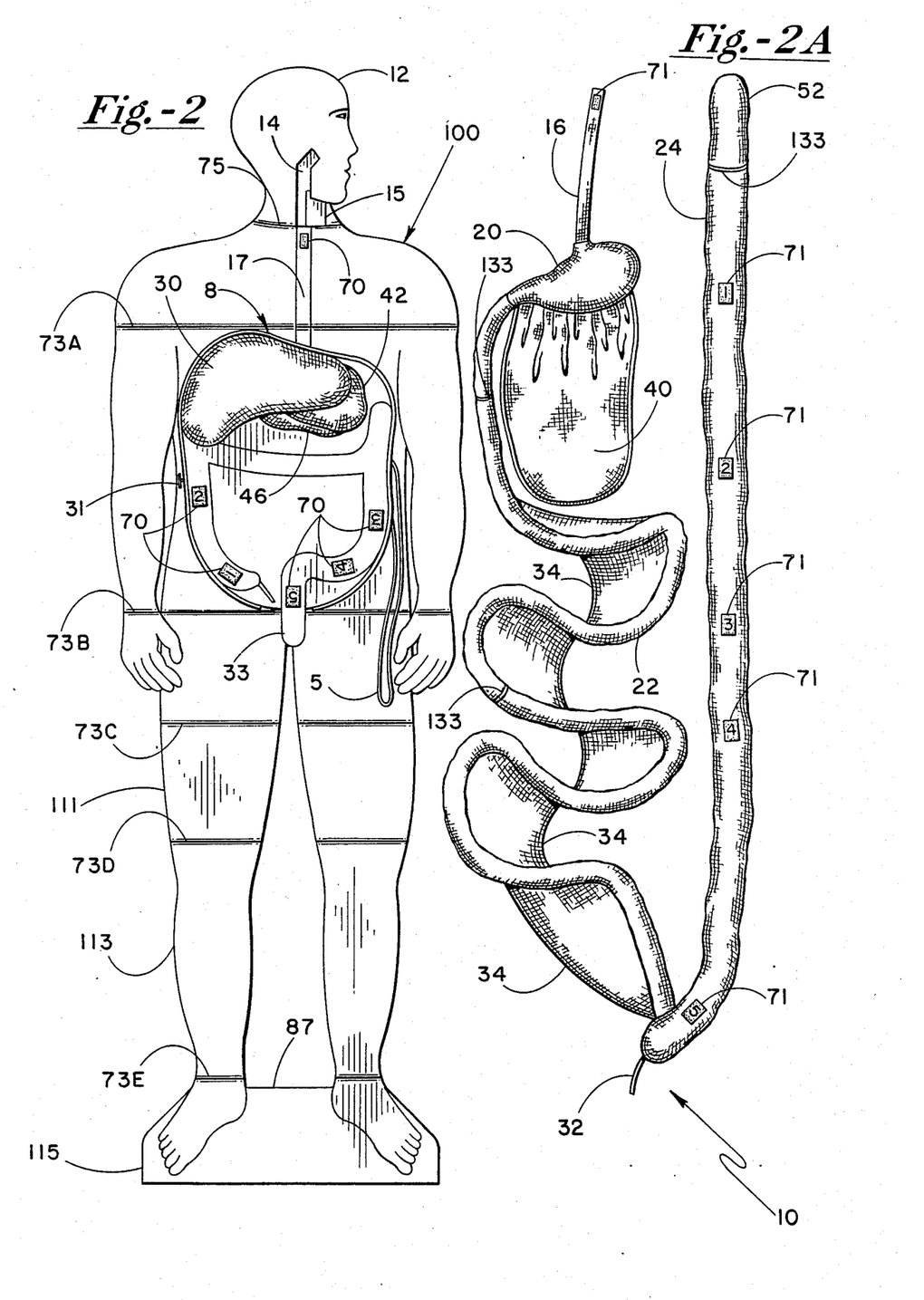
FIGS. 2 and 2A show another view of the model of the invention wherein the silhouette of the human body which forms the support surface of the invention is fully extended and the group of organs representing the digestive tract has been removed and extended.

Referring now to FIGS. 2 and 2A another view of the model provided by the invention is shown illustrating first and second groups of elements representing organs wherein the first group of organs is flexibly attached to the abdominal tray but not removable and the second group of organs is totally removable from the abdominal shelf. Those skilled in the art will appreciate that the choice of which organs are removable versus those which are not made removable is not critical to the fabrication of the invention but depends upon the intended application of the model. It would be feasible, for example, to construct a model within the scope of the invention wherein all of the organs are made removable. Referring now to the first group of elements, these comprise the liver 30, the pancreas 46 and other elements better illustrated in FIG. 4 as discussed below. Still referring to FIG. 2, the second group of elements comprises the organs which make up the entire GI tract with the exception of the pharynx. The second group includes elements representing the esophagus 16, the stomach 20, the greater omentum 40, the small intestine 22, the mesentery 34, the large intestine 24, the appendix 32 and the rectum 52. Also shown is a fabric outline 33 which provides reference points for reattaching organ elements which have been removed. The outline 33 is color coded to match the corresponding organ elements which are positioned over the outline, namely, the large intestine and the rectum. Also included in the outline are attachment means 70, preferably velcro strips, which may be marked with reference indicia corresponding to mating attachment means 71 on the removable organ elements. The attachment means 70 and the mating attachment means 71 carry like positioning numbers, as for example numerals 1-5 which designate their position on the outline and can advantageously be used to replace the organ elements into their correct position in the abdominal tray.

As best can be seen in FIG. 2A, the removable group of organ elements including the esophagus 16, stomach 20, greater omentum 40, small intestine 22, mesentery 34, rectum 52, large intestine 24 and appendix 32 have interconnections which replicate the corresponding interconnections in the human body. The removable elements may be made to full scale in the preferred embodiment, allowing one to easily demonstrate the length of the various organs upon removing them from the abdominal tray.

Also shown in FIG. 2 are fold lines or creases 73A-73E which allow the model to be folded up for easy storage and transportation. Note that the head also can be folded inwardly at crease 75.

Figure 3:
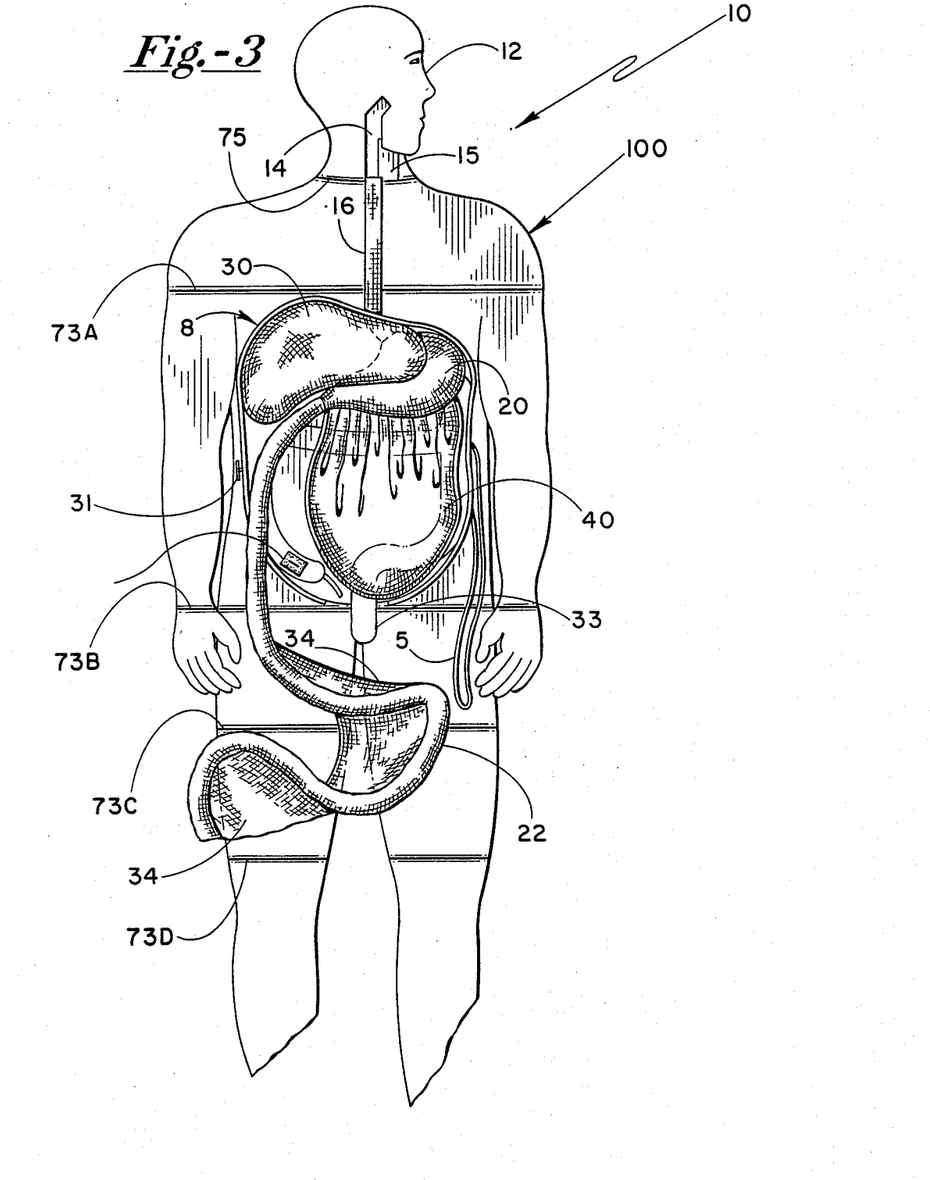
FIG. 3 shows another view of the model of the invention illustrating the positioning of various organs and extension of membranes within the model.

Referring now to FIG. 3 a view of the model is shown which demonstrates the ability to remove only part of the removable organs while keeping the stomach and greater omentum, in this example, in place. In this way, one can use the model to demonstrate the functions of the membranes and their location within the body.

Figure 4:
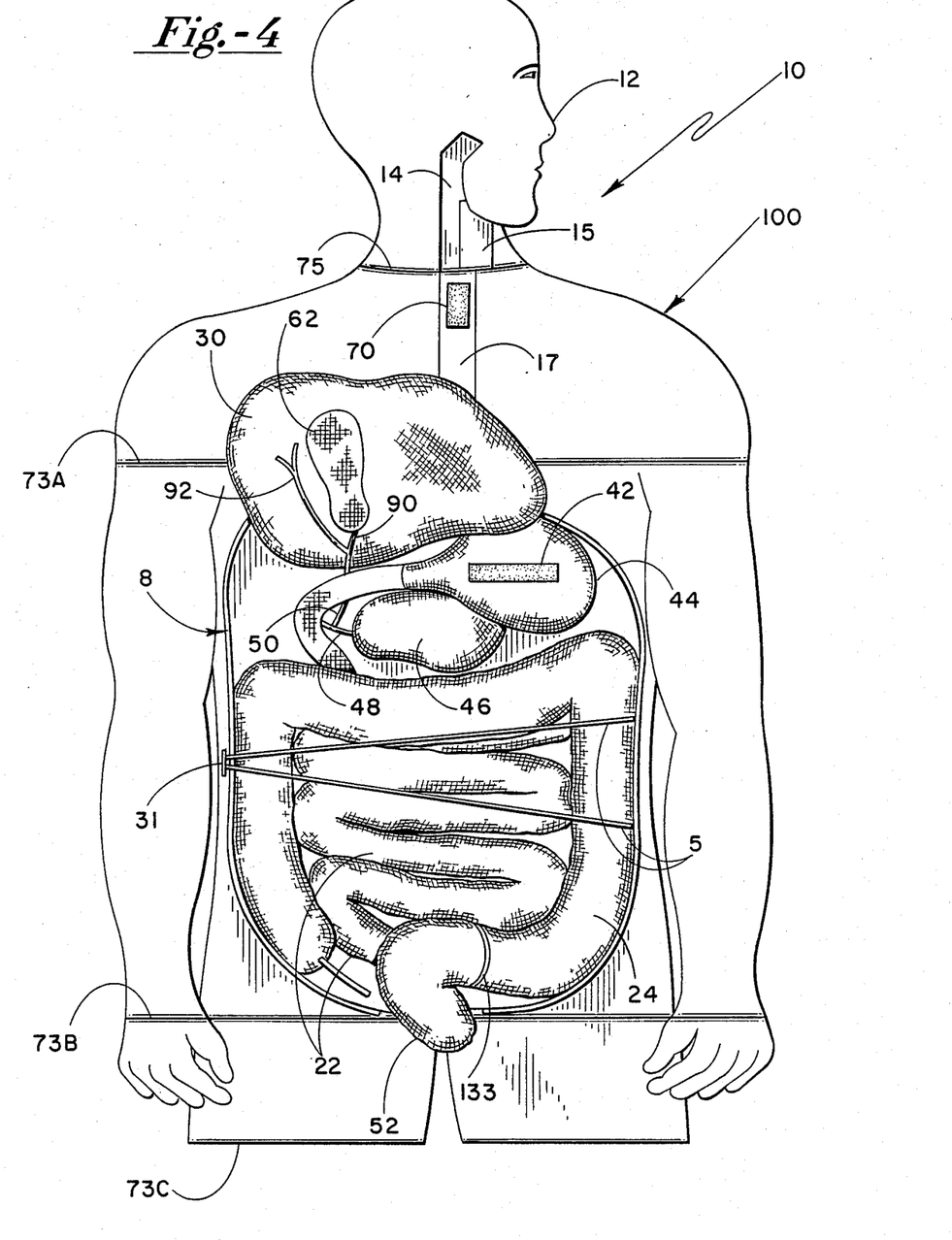
FIG. 4 is another view of the model of the invention illustrating the movable feature of the liver in order to expose the gall bladder and associated ducts.

Referring now to FIG. 4, yet another view of the model is shown wherein the element representing the liver 30 is folded over to reveal the elements representing the organs and ducts underneath the liver. Note that the liver element 30 is attached in a hinge-like manner to allow this exposure of the otherwise hidden elements. This view also shows the outline of the stomach 44 and the attachment means for the stomach 42 which is preferably a velcro strip. When the area beneath the liver element is exposed in this manner one can view a gall bladder element 62, hepatic duct element 92, a common bile duct element 50, a pancreatic duct element 48, a pancreas element 46, and a cystic duct element 90.

Having described the major features of the invention, it is believed that the invention will be better understood through a more detailed description of typical materials which may be used in constructing the model of the invention.

As is best shown in FIG. 2, in the preferred embodiment, the model of the invention is fabricated in the shape of a human silhouette from 220 lb. laminated corrugated plastic. In one example embodiment, this silhouette is about 69" in height by about 21½" in width at the widest point. The silhouette is scored at the neck 75, upper chest 73A and pelvic region 73B. These regions of the silhouette are scored so as to form individual sections which can be folded. The silhouette is further divided into separate sections at the thigh 111, lower leg 113 and ankle 115 sections. The sections are joined at appropriate locations forming joints which are flexible. The model folds at these joints so as to allow the model to be reduced in size for demonstration purposes, storage and shipping.

In the preferred embodiment, the front of the silhouette is covered with burlap fabric from the neck to the base. An outline of the hands, arms, and feet are preferably drawn and painted on the burlap. The entire back surface (not shown) of the model may be advantageously covered with vinyl fabric. A 1" metal ring 82 (shown in FIG. 5) may be attached to the back of the head for wall mounting.

Referring again continuously to FIGS. 1 and 2, an extruded polystyrene relief carving of the head 12 may be advantageously attached to the head region of the corrugated plastic silhouette in the preferred embodiment. The pharynx 14 is preferably indicated by a cut-away section in the polystyrene. A larynx element 15 is preferably indicated in the neck region by a cloth silhouette. The abdominal tray is preferably made of corrugated cardboard, ⅛" vinyl molding, metal strips, hook 31, and a cord 5. The outer wall of the tray 9 is preferably covered with burlap and the tray is attached to the support surface 100 with appropriate attachment means such as metal screws. The abdominal tray 8 houses the organs of the digestive system as detailed above. The esophagus element 16 extends upward from the stomach through the thoracic region to the lower end of the pharynx 14. Elements representing the gastrointestinal tract, liver, gall bladder, and pancreas are made of various colors of calico printed fabric and are preferably stuffed with 100% polyester fill or similar fill— with the exception of the esophagus which is advantageously not filled. In one embodiment of the invention, the pharynx is represented by a tan colored element, the esophagus by a medium blue element, the stomach by a yellow element, the small intestine by a dark blue element, the large intestine by a red element, the rectum by a red element, the liver by a maroon element, the gall bladder by a green element, the pancreas by a lavender element, all of the aforesaid elements comprised of calico print, cotton and cotton polyester blend fabric. Chenille stems represent various ducts and the appendix, including yellow to represent the appendix, green to represent the hepatic ducts, light green to represent the cystic duct, a green/light green combination to represent the common bile duct and purple or lavender stems to represent the pancreatic duct. Nylon netting is used in the example embodiment of the invention to represent the greater omentum with the color yellow and the mesentery with the color blue. Those skilled in the art will recognize that the choice of colors for coding the organ elements is not critical, but that the object of the invention is to present a model of the human organ system which is viewed as non-threatening to persons having no medical background.

Referring again to FIGS. 2 and 2A, ⅛" nylon ribbon is preferably used to delineate regions of the small intestine and colon-rectum junction 133. The gastrointestinal tract is held in position with velcro and a ⅛" nylon cord 5 which extends from one side of the abdominal tray and attaches to a hook 9 mounted on the opposite side of the tray. Calico fabric outlines of the stomach, small intestine, large intestine and rectum are attached to the back of the abdominal tray in the abdominal area. These outlines are used as points of reference showing the natural position of the organs when the gastrointestinal tract is changed or removed and again when the position of the gastrointestinal tract is reinserted into the abdominal tray.

Figure 5:
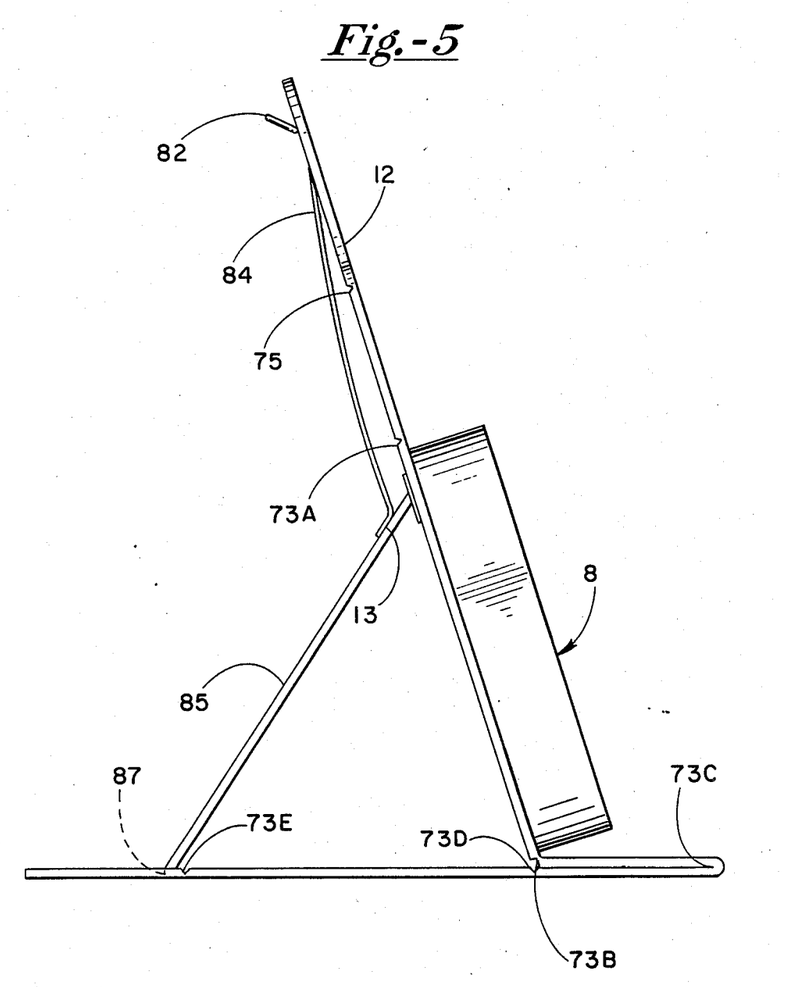
FIG. 5 illustrates the table stand support features of the invention.

Referring now to FIG. 5, a side view of the model is shown illustrating the positioning of the model into an arrangement suitable for a table display. Ribbon 84, which is preferably a 100% nylon ribbon, is attached to the head 12 and includes a velcro strip on the opposite end 13 which is used to anchor the head into an upright position and also to anchor the model to its storage box. A brace 85 or equivalent structure supports the model in this free standing folded position. In the example embodiment, the brace 85 has a first end attached to the back side of the supporting surface and a second end resting against edge 87 which is located around the ankle portion of the model. In the preferred embodiment, several pieces of velcro or equivalent fasteners may be attached to the back of the model to be used to hold the legs and feet in a folded position, to anchor the model to its storage box and to secure the brace in either of two positions. One position being the upright demonstration position shown and the second position being the storage position.

Figure 6:
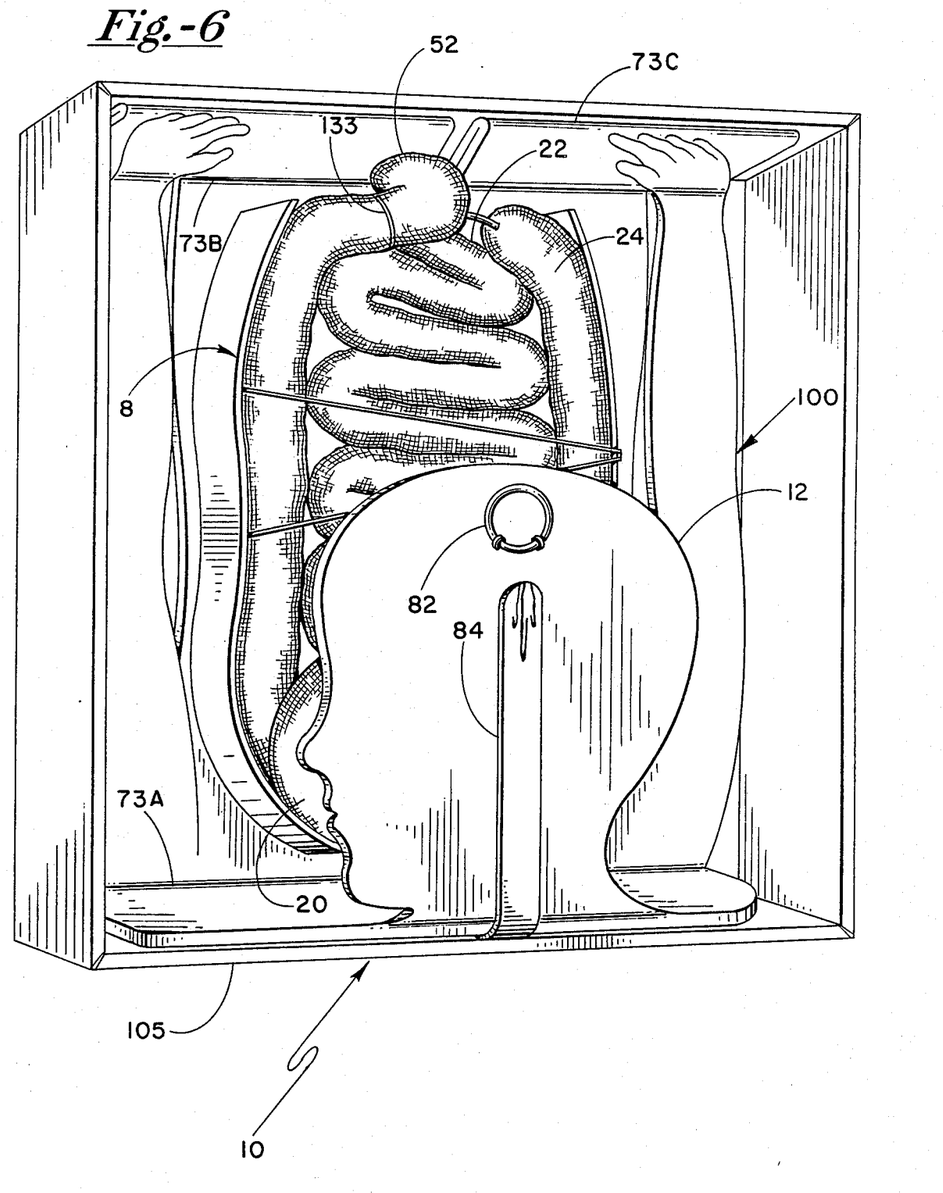
FIG. 6 is an illustration of the storage features of the model of the invention.

Referring now to FIG. 6 an example of a model in its storage position is shown. Box 105 is suitably constructed to contain the folded model of the invention in the position shown. Box 105 may have velcro strips (not shown) corresponding to mating strips on the model itself in order to facilitate positioning and containment of the model in the Box 105.

Having described herein above the materials which describe an example embodiment of the invention, a method of fabricating the invention will be briefly described. Referring now continuously to FIGS. 1 and 2, the foam head 12 is cut out, carved and painted. The plastic silhouette forming the support surface 100 is cut out and scored at the neck, shoulders and pelvic region. Next the joints of the upper thigh, knee and ankles are cut and preferably taped for extra support. Burlap is glued to the front silhouette, exclusive of the head region. Next outlines of arms, hands and feet are painted on the burlap.

Referring now to the back of the model as shown in FIGS. 5 and 6, the metal ring 82 is attached to the head region in a well known manner. The entire back surface of the support surface silhouette is covered with vinyl. The support 85 is preferably fabricated from wood and covered with vinyl prior to attaching it to the back of the support surface using a vinyl hinge. Finally, velcro pieces are preferably glued onto the back of the support surface in an arrangement suitable for allowing folding of the model and attachment to the storage box.

Next the fabrication of the abdominal tray will be described. The base or back plate of the tray is fabricated from cardboard and covered with burlap. Vinyl molding to form the walls 9 is cut to proper size including scoring and tabs where necessary for attachment to a back plate. The vinyl tabs are then glued to the cardboard back plate. Metal shaping strips are attached to the outer surface of the tray wall in a well known manner and the tray wall is covered with burlap.

Next the calico outlines of the organ elements may be glued to the back plate of the tray. The abdominal tray may then be fastened to the support surface with aluminum blind nut fasteners or equivalent fasteners. Next the outlines of the elements representing the esophagus, stomach, small intestine, large intestine and rectum are glued to the model followed by gluing elements representing the pancreas, liver and small intestine.

Next the foam head may be attached in a well known manner, preferably by gluing to the silhouette support service. Finally the GI tract may be placed in its natural position in the model. Note that the GI tract be preassembled prior to this step. The model may be placed in a carrying case such as box 105.

One alternative embodiment of the invention comprises a child size model wherein some of the minor organs have been omitted, namely, the greater omentum, mesentery, ducts, gall bladder and pancreas. Such omissions highlight the major organs and simplify the teaching model. Those skilled in the art will recognize that other organs may similarly be exhibited or omitted depending upon the application of the teaching model. Similarly, other materials may be substituted for the materials described above. This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications can be accomplished without departing from the scope of the invention itself.

What is claimed is:

1. A model for the demonstration of human organ systems, including organs of the digestive system, comprising:
   (a) a sectioned, rigid backboard having a plurality of sections including a mid-section wherein the backboard is foldable at the sections and wherein the backboard has the shape of a human silhouette;
   (b) an abdominal tray including a back surface attached to the mid-section;
   (c) a first group of elements housed within the abdominal tray and attached to the back surface wherein the first group comprises three dimensional actual shape simulated organs and includes elements representing a liver, a pancreas, a gall bladder and a plurality of ducts, and wherein the liver, pancreas and gall bladder are made substantially of flexible filled material; and
   (d) a second group of elements at least partially housed within the abdominal tray and detachably mounted to the support surface wherein the second group comprises three dimensional actual shape simulated organs and includes elements representing an esophagus, a stomach, a greater omentum, a small intestine, a mesentery, an appendix, a large intestine and a rectum, and wherein the second group of elements is made substantially of flexible filled material.

2. The model of claim 1 further including an outline within the abdominal tray showing outlines representing the locations of the stomach, small intestine, large intestine, esophagus and rectum so as to provide points of reference for re-attachment of the second group of elements.

3. The model of claim 1 wherein the elements representing the liver, pancreas, gall bladder, esophagus, stomach, small intestine, large intestine and rectum are comprised of color coded calico fabric.

4. The model of claim 1 wherein the ducts and appendix are comprised of color coded chenille stems.

5. The model of claim 1 wherein the greater omentum and mesentery are comprised of color coded nylon netting.

6. The model of claim 1 wherein the second group of elements are detachably mounted to the abdominal tray with velcro patches.

7. The model of claim 1 wherein the model further includes a stand suitable for supporting the model in a substantially upright position on a flat surface.

8. The model of claim 1 wherein the outline further includes an outline of a larynx and pharynx.

9. The model of claim 1 wherein the second group of elements are interconnected in an arrangement so as to retain the continuity of substantially all of the digestive tract when removed.

10. The model of claim 1 further including a cord attached to the abdominal tray so as to hold all of the elements in the abdominal tray in place.

11. The model of claim 1 wherein the gall bladder element is attached to the liver element and the liver element is attached to the abdominal tray in a hinge-like arrangement so as to allow the liver element to be folded upwards to display the elements representing the gall bladder, pancreas and the plurality of ducts.

12. The model of claim 1 wherein the plurality of sections includes a neck section, a shoulder section, a pelvic section, an upper thigh section, a knee section and an ankle section wherein the backboard is foldable at each of the sections.

* * * * *